(12) United States Patent
Germain et al.

(10) Patent No.: US 10,726,858 B2
(45) Date of Patent: Jul. 28, 2020

(54) NEURAL NETWORK FOR SPEECH DENOISING TRAINED WITH DEEP FEATURE LOSSES

(71) Applicant: INTEL CORPORATION, Santa Clara, CA (US)

(72) Inventors: Francois Georges Germain, Stanford, CA (US); Qifeng Chen, Cupertino, CA (US); Vladlen Koltun, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 16/133,919

(22) Filed: Sep. 18, 2018

(65) Prior Publication Data

US 2019/0043516 A1    Feb. 7, 2019

Related U.S. Application Data

(60) Provisional application No. 62/763,593, filed on Jun. 22, 2018.

(51) Int. Cl.
| | | |
|---|---|---|
| G10L 15/00 | (2013.01) | |
| G10L 21/0208 | (2013.01) | |
| G06N 5/04 | (2006.01) | |
| G06N 3/08 | (2006.01) | |
| G10L 15/16 | (2006.01) | |
| G06N 3/04 | (2006.01) | |
| G10L 25/30 | (2013.01) | |
| G10L 15/07 | (2013.01) | |

(52) U.S. Cl.
CPC ........ *G10L 21/0208* (2013.01); *G06N 3/0454* (2013.01); *G06N 3/084* (2013.01); *G06N 5/046* (2013.01); *G10L 15/16* (2013.01); *G10L 15/07* (2013.01); *G10L 25/30* (2013.01)

(58) Field of Classification Search
CPC combination set(s) only.
See application file for complete search history.

(56) References Cited

PUBLICATIONS

Y. Wang and D. Wang, "Cocktail party processing via structured prediction," in Neural Information Processing Systems (NIPS), 2012, 9 pages.

(Continued)

*Primary Examiner* — Vu B Hang
(74) *Attorney, Agent, or Firm* — Finch & Maloney PLLC

(57) ABSTRACT

Techniques are provided for speech denoising using a denoising neural network (NN) trained with deep feature losses obtained from an audio classifier NN. A methodology implementing the techniques according to an embodiment includes applying the speech denoising NN, to be trained, to a noisy sample of a training speech signal to generate a processed training speech signal. The method further includes applying a trained audio classifier NN to the processed training speech signal to generate a first set of activation features, and applying the trained audio classifier NN to a clean sample of the training speech signal to generate a second set of activation features. The method further includes calculating a loss value based on the first and second sets of activation features, and performing a back-propagation training update of the denoising NN, based on the loss value. The method includes iterating this process to further train the denoising NN.

20 Claims, 6 Drawing Sheets

(56) References Cited

PUBLICATIONS

X. Lu, Y. Tsao, S. Matsuda, and C. Hori, "Speech enhancement based on deep denoising autoencoder," in Interspeech, 2013, 5 pages.

A. Narayanan and D. Wang, "Ideal ratio mask estimation using deep neural networks for robust speech recognition," in IEEE International Conference on Acoustics, Speech and Signal Processing (ICASSP), 2013, pp. 7092-7096.

F. Weninger, J. R. Hershey, J. L. Roux, and B. Schuller, "Discriminatively trained recurrent neural networks for single-channel speech separation," in IEEE Global Conference on Signal and Information Processing, 2014, 5 pages.

Y. Xu, J. Du, L.R. Dai, and C.H. Lee, "A regression approach to speech enhancement based on deep neural networks," IEEE/ACM Transactions on Audio, Speech and Language Processing, vol. 23, 2013, 13 pages.

A. Kumar and D. Florencio, "Speech enhancement in multiple-noise conditions using deep neural networks," arXiv:1605.02427, 2016, 5 pages.

X.L. Zhang and D. Wang, "A deep ensemble learning method for monaural speech separation," IEEE/ACM Transactions on Audio, Speech, and Language Processing, vol. 24, No. 5, 2016, pp. 967-977.

J. Chen and D. Wang, "Long short-term memory for speaker generalization in supervised speech separation," Interspeech, 2016, 5 pages.

Y. Wang and D. Wang, "A deep neural network for time-domain signal reconstruction," in IEEE International Conference on Acoustics, Speech and Signal Processing (ICASSP), 2015, pp. 4390-4394.

H. Erdogan, J. R. Hershey, S. Watanabe, and J. L. Roux, "Phase-sensitive and recognition-boosted speech separation using deep recurrent neural networks," in IEEE International Conference on Acoustics, Speech and Signal Processing (ICASSP), 2015, 7 pages.

D. S. Williamson and D. Wang, "Time-frequency masking in the complex domain for speech dereverberation and denoising," IEEE/ACM Transactions on Audio, Speech, and Language Processing, vol. 25, No. 7, 2017, pp. 1492-1501.

S.W. Fu, Y. Tsao, X. Lu, and H. Kawai, "Raw waveform-based speech enhancement by fully convolutional networks," arXiv:1703.02205, 2017, 7 pages.

D. Rethage, J. Pons, and X. Serra, "A WaveNet for speech denoising," arXiv:1706.07162, 2018, 11 pages.

S. Pascual, A. Bonafonte, and J. Serra, "SEGAN: Speech enhancement generative adversarial network," arXiv:1703.09452, 2017, 5 pages.

K. Qian, Y. Zhang, S. Chang, X. Yang, D. Florencio, and M. Hasegawa-Johnson, "Speech enhancement using Bayesian WaveNet," in Interspeech, 2017, 5 pages.

J. Johnson, A. Alahi, and L. Fei-Fei, "Perceptual losses for realtime style transfer and super-resolution," in European Conference on Computer Vision (ECCV), 2016, 17 pages.

A. van den Oord, S. Dieleman, H. Zen, K. Simonyan, O. Vinyals, A. Graves, N. Kalchbrenner, A. W. Senior, and K. Kavukcuoglu, "WaveNet: A generative model for raw audio," arXiv:1609.03499, 2016, 15 pages.

A. L. Maas, A. Y. Hannun, and A. Y. Ng, "Rectifier nonlinearities improve neural network acoustic models," Proceedings of the 30th International Conference on Machine Learning, 2013, 6 pages.

Q. Chen, J. Xu, and V. Koltun, "Fast image processing with fullyconvolutional networks," in International Conference on Computer Vision (ICCV), 2017, pp. 2497-2506.

S. Ioffe and C. Szegedy, "Batch normalization: Accelerating deep network training by reducing internal covariate shift," arXiv:1502.03167, 2015, 11 pages.

K. Simonyan and A. Zisserman, "Very deep convolutional networks for large-scale image recognition," arXiv:1409.1556, 2015, 14 pages.

X. Glorot and Y. Bengio, "Understanding the difficulty of training deep feedforward neural networks," in International Conference on Artificial Intelligence and Statistics (AISTATS), 2010, pp. 249-256.

D. P. Kingma and J. Ba, "Adam: A method for stochastic optimization," arXiv:1412.6980, 2017, 15 pages.

NEURAL NETWORK FOR SPEECH DENOISING TRAINED WITH DEEP FEATURE LOSSES

CROSS-REFERENCE TO RELATED APPLICATIONS

This application claims the benefit of U.S. Provisional Application No. 62/763,593 filed on Jun. 22, 2018, which is herein incorporated by reference in its entirety.

BACKGROUND

Speech processing systems, including speech recognition systems, speech enabled devices, hearing aids and the like, are often required to work on received audio signals that are degraded by the presence of background noise. Techniques to remove this noise, sometimes referred to as denoising or as enhancement, are used to improve the audio signal quality so that the underlying speech can be recognized and understood, whether by a human listener or by subsequent processing systems.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
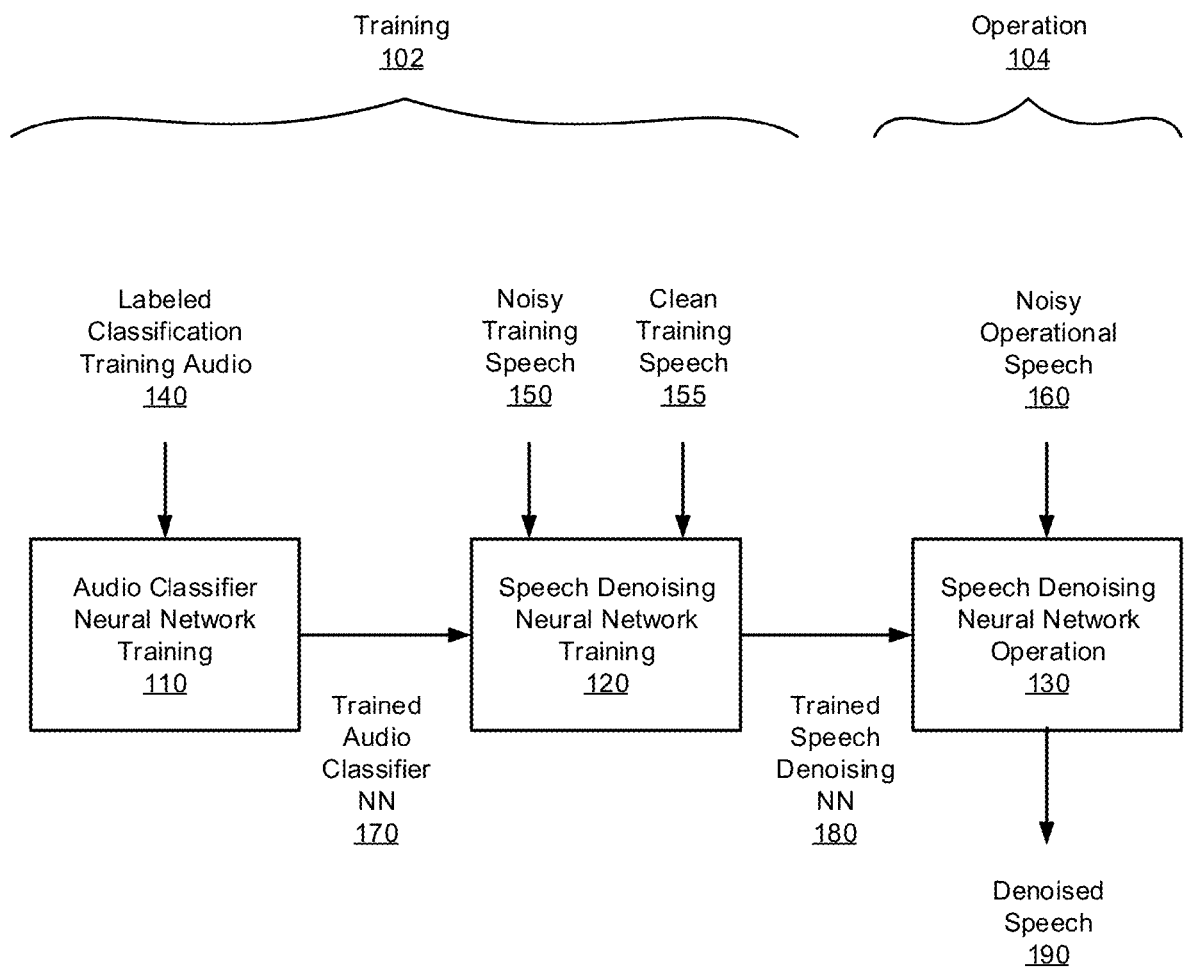
FIG. 1 is a top-level flow diagram illustrating training and operation of a speech denoising neural network with deep feature losses, in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided for speech denoising, which is a process for the reduction or elimination of additive background noise from a signal containing speech. Denoising is an important operation in many audio processing systems, as it improves the audio signal quality such that the underlying speech can be recognized and understood, either by a human listener or by subsequent automated speech recognition systems.

The disclosed techniques employ a denoising neural network which is trained with deep feature losses (sometimes also referred to as deep perceptual losses) extracted from another neural network, the other neural network configured as an audio classifier. The audio classifier neural network is pre-trained to identify various types of audio sounds, as will be explained in greater detail below. The deep feature losses are based on a comparison of the internal activation patterns or features which are induced in the audio classifier neural network in response to two signals: (1) a noise free sample of training data, and (2) noisy training data that has been processed by the denoising neural network being trained. This comparison incorporates multiple audio features at a number of different time scales (as encoded by the audio classifier network) in the two signal waveforms, and avoids the need for manual tuning of the loss function based on expert subject matter knowledge, as will be explained in greater detail below.

The disclosed techniques can be implemented, for example, in a computing system or a software product executable or otherwise controllable by such systems, although other embodiments will be apparent. The system or product is configured to perform speech denoising using a denoising neural network trained with deep feature losses obtained from an audio classifier neural network. In accordance with an embodiment, a methodology to implement these techniques includes training a speech denoising neural network by providing a noisy sample of a training speech signal to the speech denoising neural network to be trained, to generate a processed training speech signal. The method further includes applying a pre-trained audio classifier neural network to the processed training speech signal to generate a first set of activation features, and applying the pre-trained audio classifier neural network to a clean sample of the training speech signal to generate a second set of activation features. The method further includes calculating a loss value based on the first and second sets of activation features, and performing a back-propagation training update of the denoising neural network, based on the loss value. The method further includes iterating this process on additional noisy and clean samples of training speech signals to further train the denoising network to generate a trained speech denoising neural network. The trained speech denoising neural network may then be employed to process noisy operational speech signals to generate denoised speech signals.

As will be appreciated, the techniques described herein may provide an improved method for speech denoising with greater efficiency, compared to existing techniques that require complex statistical signal processing, computationally expensive spectrogram transforms, or the use of expert knowledge for manual tuning of the loss functions. The disclosed techniques can be implemented on a broad range of platforms including smartphones, smart-speakers, laptops, tablets, video conferencing systems, hearing aids, gaming systems, smart home control systems, and robotic systems. These techniques may further be implemented in hardware or software or a combination thereof.

FIG. 1 is a top-level flow diagram 100 illustrating training 102 and operation 104 of a speech denoising neural network with deep feature losses, in accordance with certain embodiments of the present disclosure. As shown in the training phase 102, at operation 110, an audio classifier neural network is first trained with labeled classification training audio 140 to generate the trained audio classifier neural network 170. In some embodiments, the audio classifier neural network 170 is a convolutional neural network comprising multiple convolutional layers, as will be described in greater detail below. The audio classifier neural network 170 is configured to recognize audio signals and identify them with classification labels, based on the training.

The labeled classification training audio 140 may include domestic (household) sounds such as, for example, background noise from appliances, percussive sounds (e.g., crashes, bangs, knocks, footsteps), videogame/television sounds, and speech from adult males, adult females, and children, etc. The labeled classification training audio 140 may also include sounds associated with different environments, such as, for example, restaurants, bus stations, urban locations, forests, beaches, etc. The training of the audio classifier neural network 110 may be performed using known techniques in light of the present disclosure. In some embodiments, the training may be for single (i.e., unique) label classification, multilabel classification, joint training on two tasks—single label and multiple label classification—, or on any number of joint tasks from either or both categories.

Next, at operation 120, a speech denoising neural network is trained based on a combination of noisy training speech 150 and associated clean training speech 155. This operation generates a trained speech denoising neural network 180. In some embodiments, the speech denoising neural network 180 is a convolutional neural network comprising multiple dilated convolutional layers, as will be described in greater detail below.

The training employs deep feature losses extracted from the audio classifier neural network 170, as will be explained in greater detail below in connection with FIG. 2. At a high level though, rather than applying a traditional loss function between the ground truth (i.e., clean speech) and the output of the denoising network, the deep feature loss function employed by the disclosed techniques is calculated between the features extracted from the shallowest (topmost) layers of the pre-trained classification neural network 170 in response to the ground truth and the features extracted from the shallowest layers of the pre-trained classification neural network 170 in response to the output of the denoising network being trained. This allows for the targeting of more meaningful features in a noisy signal at multiple timescales without the need for expert knowledge tuning of the features. This also shifts the complexity of the system from the operational stage to the training stage, in which a relatively complex pre-trained classification neural network is used to train a relatively simple denoising neural network. Although classification and denoising tasks are different, there is a connection between them given that classification is performed in contexts that involve a combination of speech and background noise.

In the operational phase 104, after training has been completed, speech denoising neural network operation 130 may commence. The trained speech denoising neural network 180 is employed to process noisy operational speech 160 to generate denoised speech 190.

Figure 2:
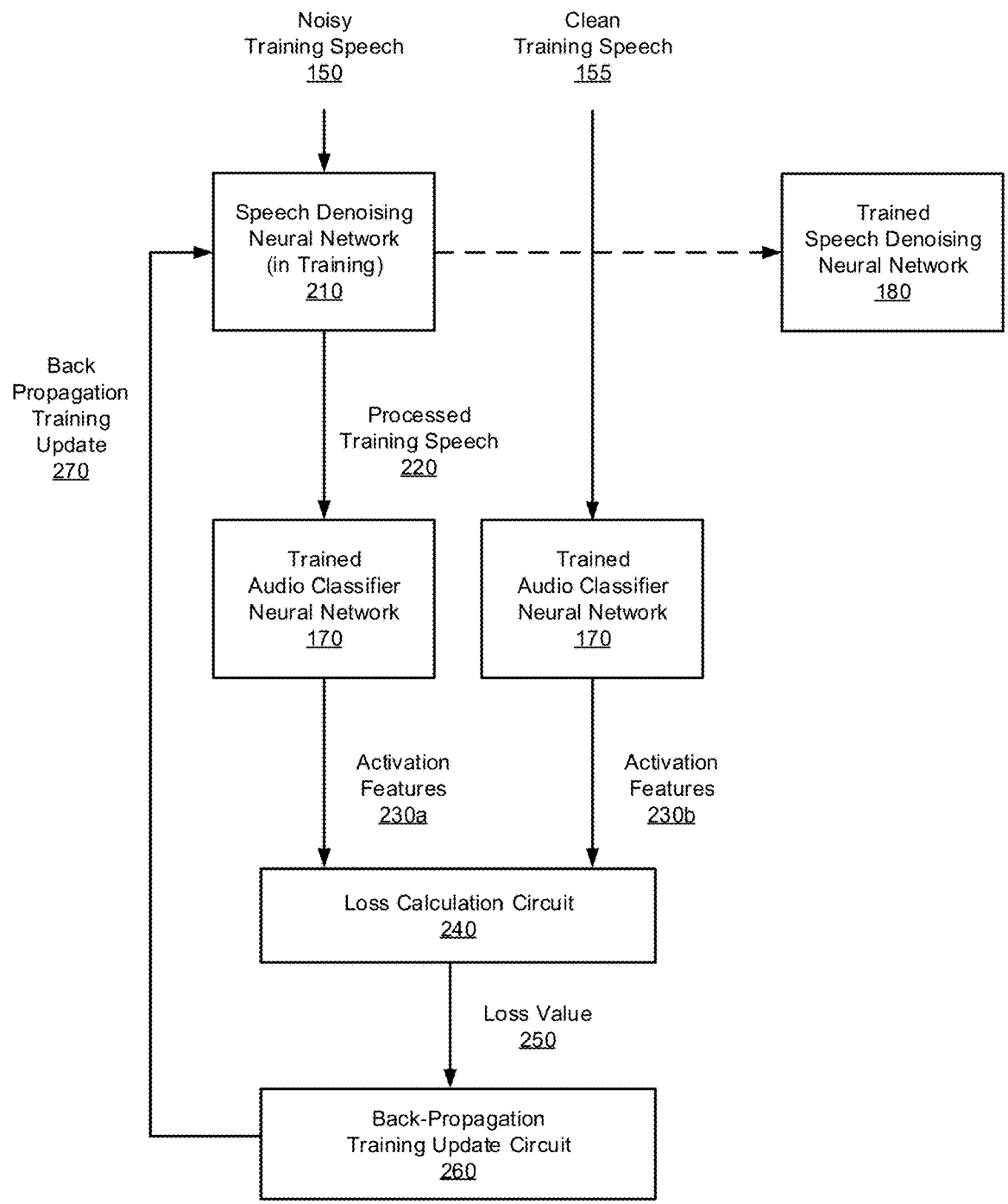
FIG. 2 is a more detailed block diagram illustrating a system for training of the speech denoising neural network, in accordance with certain embodiments of the present disclosure.

FIG. 2 is a more detailed block diagram illustrating a system 120 for training of the speech denoising neural network 180, in accordance with certain embodiments of the present disclosure. The system is shown to include speech denoising neural network (in training) 210, which evolves into the trained speech denoising neural network 180, upon completion of training. The system is further shown to include pre-trained audio classifier neural network 170, loss calculation circuit 240, and back-propagation training update circuit 260.

Noisy samples of training speech signals 150 are applied to the speech denoising neural network (in training) 210, from which processed training speech signals 220 are generated. Initially, the processed training speech signals 220 will be of relatively poor quality, with respect to denoising, but as training progresses (with the presentation of more and more training speech signals to the system) the quality can be expected to improve. The processed training speech signals 220 are applied to the trained audio classifier neural network 170, which generates a first set of activation features 230a in response. Additionally, clean samples on the training speech signals 155 are applied to the trained audio classifier neural network 170, which generates a second set of activation features 230b in response. The clean samples 155 and the noisy samples 150 include the same speech signals, but the noisy samples also include additive background noise at a selected level of signal-to-noise ratio.

In some embodiments, the activation features 230a and 230b are selected from activation features generated by a subset of the shallowest (topmost) layers of the trained audio classifier neural network 170, which correspond to features representative of the signals at range of smaller time scales. In some embodiments, the six shallowest layers are selected for extraction of activation features.

Loss calculation circuit 240 is configured to calculate a loss value based on the first and second sets of activation features. In some embodiments, the loss value calculation is a weighted least absolute distance (L1-norm) between the first set of activation features and the second set of activation features. In some embodiments, the loss value calculation may be an L2-norm or any other desired metric. In some embodiments, the weighting is chosen such that the contributions to the features from each layer in the classification network are approximately equal. This may be accomplished by initially performing unweighted training, normalizing by the empirical relative contribution of each layer after a given number of training iterations, and then continuing the training with these fixed empirical weights.

In some embodiments, the loss calculation may be expressed by the following equation:

$$L_{s,x}(\theta) = \sum_{m=1}^{M} \lambda_m \| \Phi^m(s) - \Phi^m(g(x; \theta)) \|_1$$

where $\Phi^m$ represents the feature activations of the m-th feature layer of the classifier neural network for the first through the M-th shallowest network layers included in the loss, where layers at different depths correspond to features with varying time resolutions, s is the clean signal, $g(x; \theta)$ is the output of the denoising network being trained, and $\theta$ are the parameters of the denoising network. The loss weighting factors $\lambda_m$ are selected to balance the contribution of each layer to the loss calculation. In some embodiments, the weights are set to the inverse of the relative values of $\| \Phi^m(s) - \Phi^m(g(x; \theta)) \|_1$ after 10 training iterations (during which the weights are initially set to a value of 1).

Back-propagation training update circuit 260 is configured to perform a back-propagation training update on the speech denoising neural network 210, based on the calculated loss value, to train the speech denoising neural network. The training process is iterated on additional noisy and clean samples of training speech signals to generate a trained speech denoising neural network 180.

Figure 3:
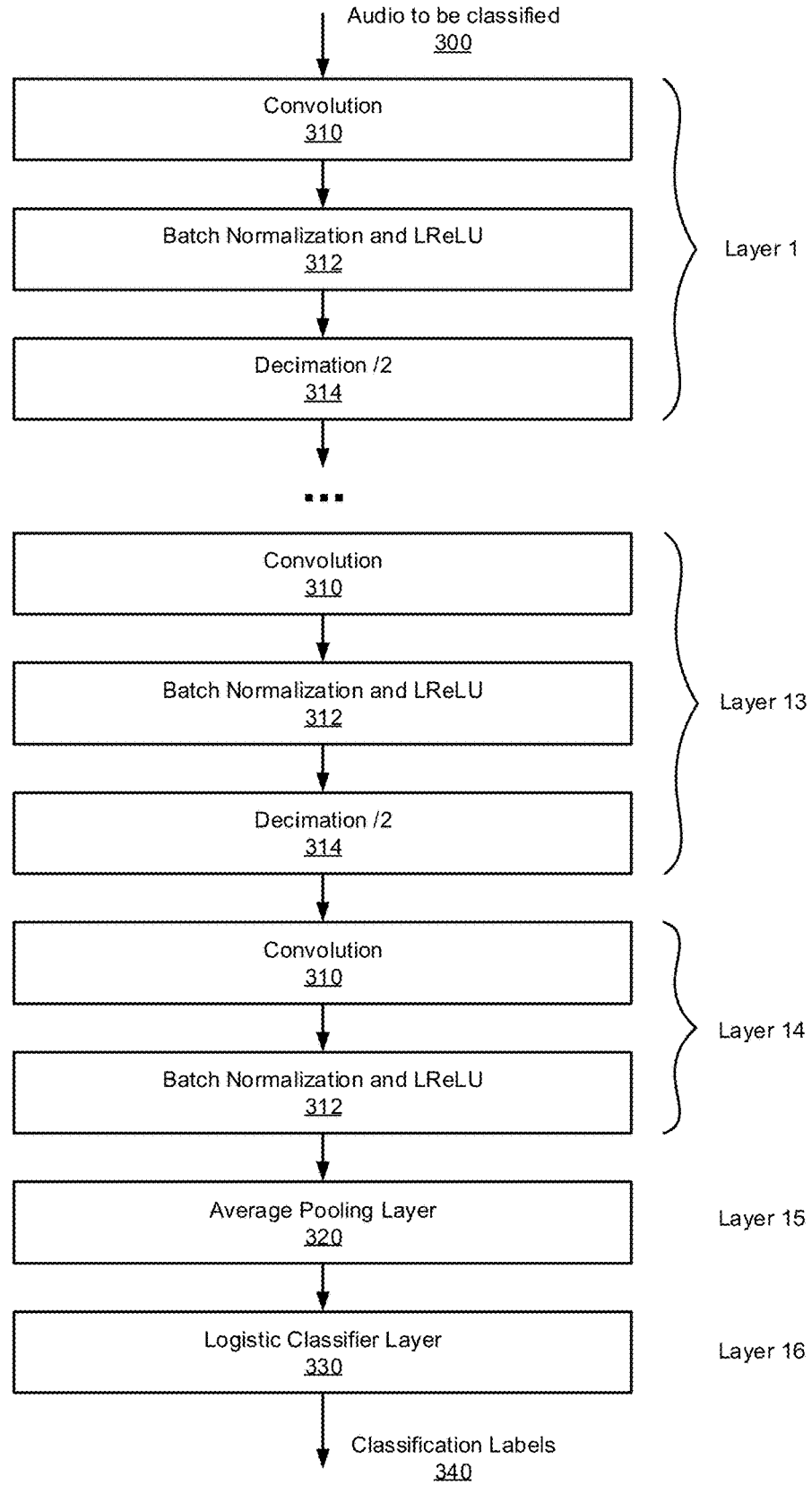
FIG. 3 is a block diagram of a trained audio classifier neural network, configured in accordance with certain embodiments of the present disclosure.

FIG. 3 is a block diagram of a trained audio classifier neural network 170, configured in accordance with certain embodiments of the present disclosure. The trained audio classifier neural network 170 is shown to include a number of layers (16 in this embodiment). Layers 1 through 13 include a convolution operation circuit 310, a normalization and nonlinearity operation circuit 312, and a decimation operation circuit 314. The convolutional operation circuit 310 is configured to calculate features of the signal, at increasing time scales, through the application of a convolutional kernel, the values of which are learned during the training process for the classifier network. In some embodiments, the convolution operation employs 3×1 convolutional kernels. In some embodiments, the normalization operation is implemented as a batch normalization, and the nonlinearity operation is implemented as a leaky rectified linear unit (LReLU). The decimation operation performs decimation (by a factor of two) between each of layers 1 through 14. Decimation is employed to achieve an exponentially increasing time scale, as compared to the linearly increasing time scale that would otherwise result from the convolutional operations.

Layer 14 includes the convolution operation circuit 310 and normalization and nonlinearity operation circuit 312, but omits the decimation. Layer 15 is shown as an average pooling layer circuit 320, and layer 16 is shown as a logistic classifier layer circuit 330. Other configurations are possible in light of the present disclosure.

The average pooling layer circuit 320 is configured to average each channel output of the final convolutional layer, over a period of time, to yield an output feature vector. The output feature vector can be fed to one (or more) logistic classifiers 330 with cross-entropy loss to perform one (or more) classification tasks. This cross-entropy loss value can be used to perform a back-propagation training update for the purpose of audio classifier neural network training 110 prior to its deployment as a trained audio classifier neural network 170 in the context of the speech denoising neural network training 120. The logistic classifier layer circuit 330 is configured to generate classification labels 340 by applying a linear transformation followed by a nonlinearity (for example using a sigmoid function for multiple label classification or a softmax function for single label classification) to the output feature vector. In the case of joint training on multiple tasks, the layers above the logistic classifier layer are shared across the tasks while the classifier layer 340 is unique for each task since each task can be of a different type and have a different set of task-specific labels.

Figure 4:
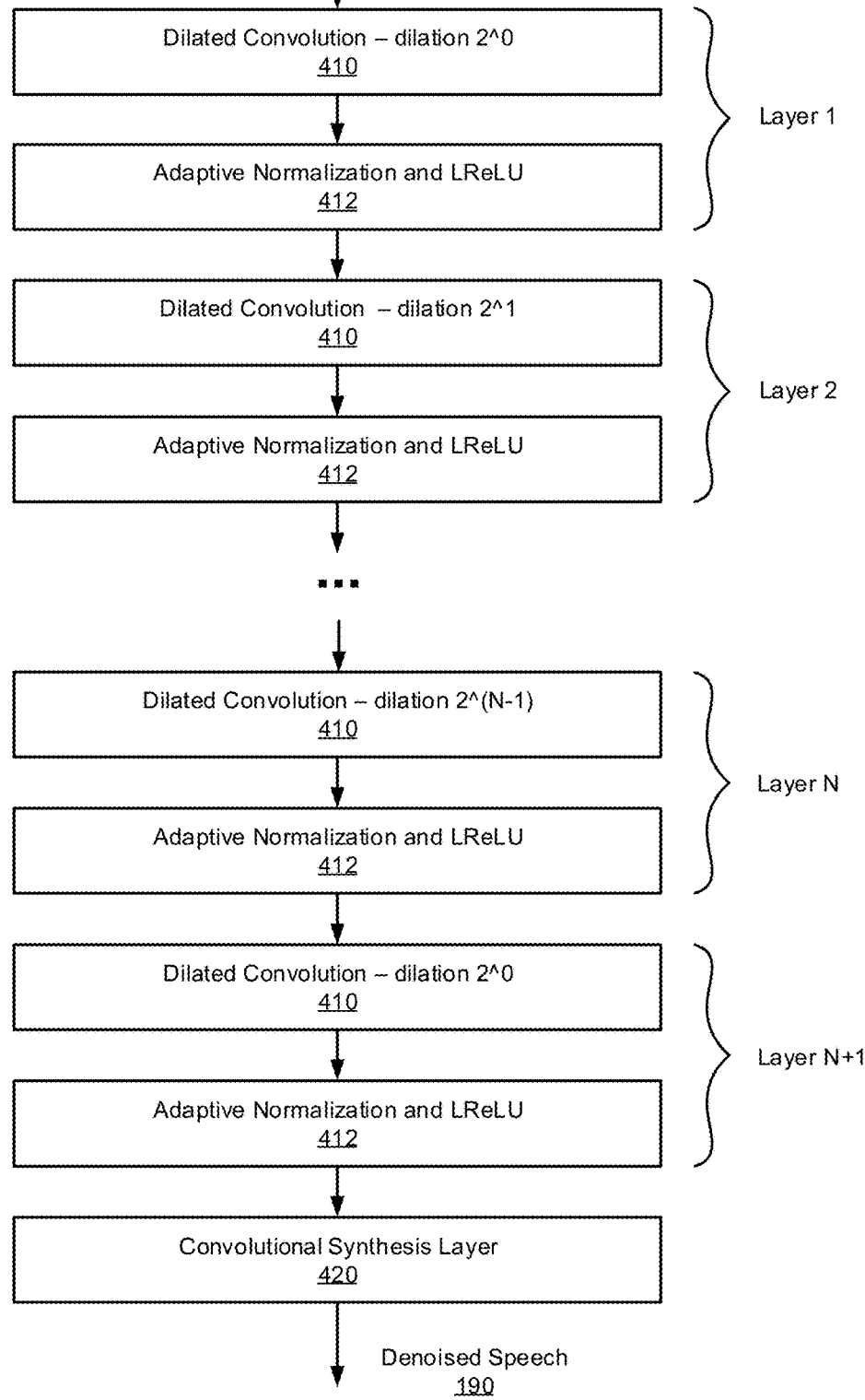
FIG. 4 is a block diagram of a trained speech denoising neural network, configured in accordance with certain embodiments of the present disclosure.

FIG. 4 is a block diagram of a trained speech denoising neural network 180, configured in accordance with certain embodiments of the present disclosure. The trained speech denoising neural network 180 is shown to include multiple (N+1) dilated convolutional layers, each including a dilated convolution operation circuit 410 and an adaptive normalization and LReLU operation circuit 412. The network 180 is also shown to include a convolutional synthesis layer 420.

The dilated convolution operation circuit 410 is configured to aggregate contextual information from the audio signal over longer time ranges with fewer convolutional layers and without loss of resolution or coverage, or the need to change sampling frequency across layers. In some embodiments, the dilation factor is increased exponentially with each layer so that the time range over which contextual information is collected increases exponentially with the number of dilated convolutional layers, for example from $2^0$ for the first dilated convolutional layer, to $2^{N-1}$ for the Nth dilated convolutional layer, although no dilation is used for the final (N+1) dilated convolutional layer. In some embodiments, the convolution is performed using a 3×1 dilated convolutional kernel.

Adaptive normalization and pointwise nonlinear LReLU operations 412 are performed on the output of each convolution operation 410. The adaptive normalization improves performance and training speed, and avoids the need for bias terms in the intermediate convolutional layers. In some embodiments, the normalization adaptively combines batch normalization and identity mapping of the normalization operator input x as the weighted sum $\alpha_k x + \beta_k BN(x)$, where $\alpha_k$ and $\beta_k$ are scalar weights for the k-th layer and BN is a batch normalization operator. The weights are network parameters which are learned by back-propagation. In some embodiments the nonlinear LReLU may be implemented by the function max(0.2x, x), where x is the input of the nonlinear LReLU.

Convolutional synthesis layer 420 is configured to synthesize the samples of the output signal using a linear transformation comprising a 1×1 convolutional kernel with bias but without normalization or nonlinearity functions. The denoised output speech signal 190 is synthesized sample by sample as the neural network is applied in a sliding fashion along the input signal, with added zero sample padding at the beginning and end of the input signal as needed to generate an output signal of the same length as the original input signal.

Because there are no skip connections across the convolutional layers of the denoising neural network, only two layers need to be stored at any given time during the computation (i.e., the previous and current layer). This provides an additional computational advantage.

In some embodiments, the denoising neural network comprises 16 convolutional layers. The first (topmost) layer, which receives the degraded (noisy) input signal 160, and the final layer, which produces the enhanced output signal 190, are of dimensionality L×1, where L is the number of samples of the input signal and the sampling frequency is 16 kHz. In general, the classifier network and the denoising network are trained to operate on the same sampling frequency, which may depend on the particular application. Each intermediate layer is of dimensionality L×W, where W is the number of feature maps in each layer and is set to 64. All layers are zero-padded so that their effective length is constant at L. The receptive field of the network is set to $2^{14}+1$ samples, which represents about one second of audio at the 16 kHz sampling rate, and thus the system is configured to capture context on the time scales of spoken words, although it can process signals of arbitrary length by applying the network in a sliding fashion for as long as necessary to capture the entire signal length.

Methodology

Figure 5:
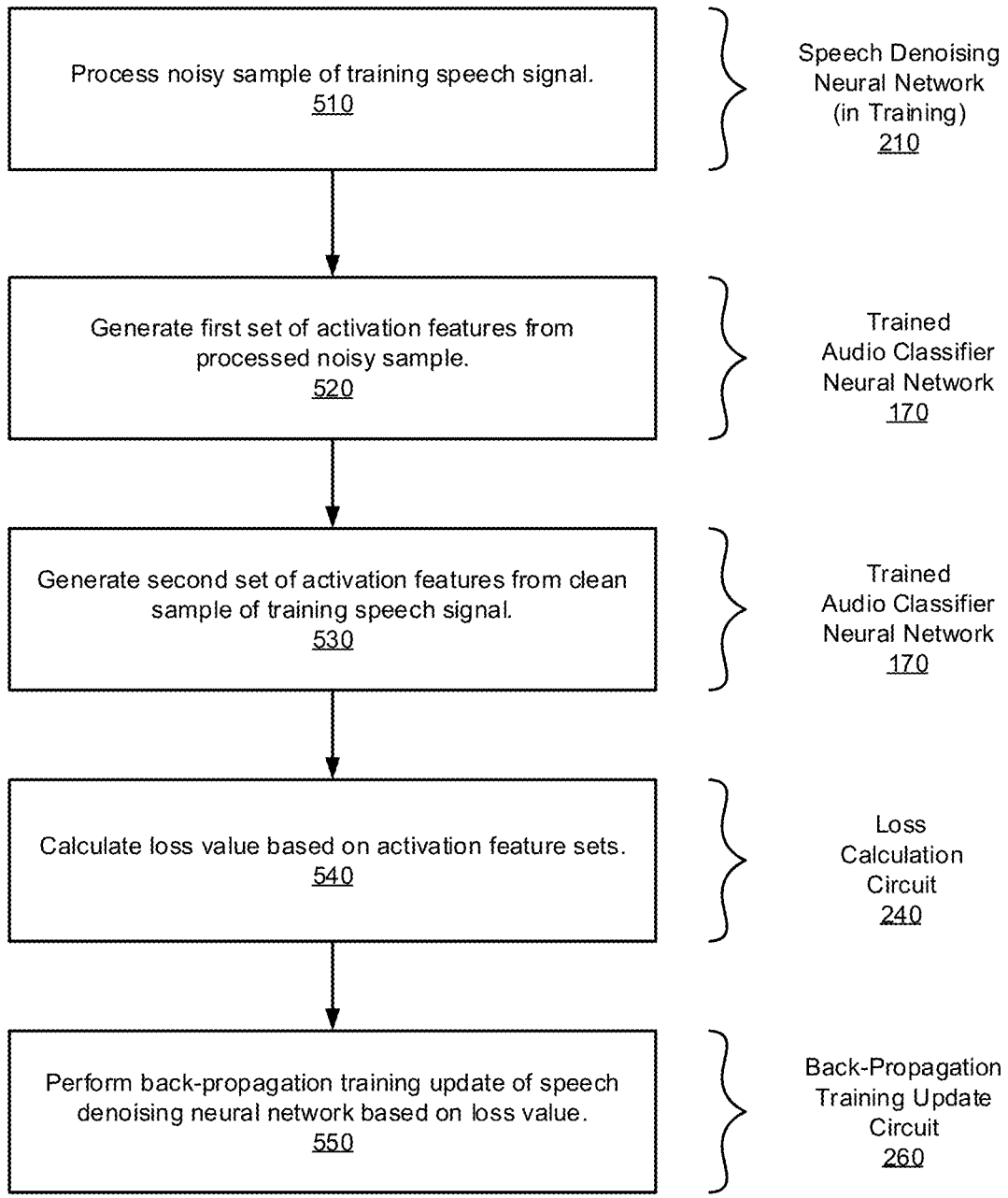
FIG. 5 is a flowchart illustrating a methodology for training the speech denoising neural network with deep feature losses, in accordance with certain embodiments of the present disclosure.

FIG. 5 is a flowchart illustrating an example method 500 for training a speech denoising neural network with deep feature losses, in accordance with certain embodiments of the present disclosure. As can be seen, the example method includes a number of phases and sub-processes, the sequence of which may vary from one embodiment to another. However, when considered in the aggregate, these phases and sub-processes form a process for training a speech denoising neural network with deep feature losses, in accordance with certain of the embodiments disclosed herein. These embodiments can be implemented, for example, using the system architecture illustrated in FIGS. 1-4, as described above. However other system architectures can be used in other embodiments, as will be apparent in light of this disclosure. To this end, the correlation of the various functions shown in FIG. 5 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 500. Thus, other embodiments may have fewer or more modules and/or sub-modules depending on the granularity of implementation. In still other embodiments, the methodology depicted can be implemented as a computer program product including one or more non-transitory machine-readable mediums that when executed by one or more processors cause the methodology to be carried out. Numerous variations and alternative configurations will be apparent in light of this disclosure.

As illustrated in FIG. 5, in an embodiment, method 500 for training the speech denoising neural network commences by processing, at operation 510, a noisy sample of a training speech signal by the speech denoising neural network being trained, to generate a processed training speech signal.

Next, at operation 520, the processed training speech signal is applied to a trained audio classifier neural network to generate a first set of activation features. At operation 530, a clean sample (e.g., without additive noise) of the training speech signal is applied to the trained audio classifier neural network to generate a second set of activation features. In some embodiments, the activation features of the first and second sets of activation features are selected from activation features generated by a subset of the shallowest layers of the trained audio classifier neural network.

At operation 540, a loss value is calculated based on the first and second sets of activation features. In some embodiments, the loss value calculation is a weighted least absolute distance (L1-norm) between the first set of activation features and the second set of activation features. In some embodiments, the loss value calculation may be an L2-norm or any other desired metric.

At operation 550, a back-propagation training update is performed on the speech denoising neural network, based on the calculated loss value, to train the speech denoising neural network. The training process is iterated on additional noisy and clean samples of training speech signals to generate a trained speech denoising neural network, where, for example, each iteration improves the performance of the network.

Of course, in some embodiments, additional operations may be performed, as previously described in connection with the system. For example, the trained speech denoising neural network may be applied to noisy operational speech signals to generate denoised speech signals.

Example System

Figure 6:
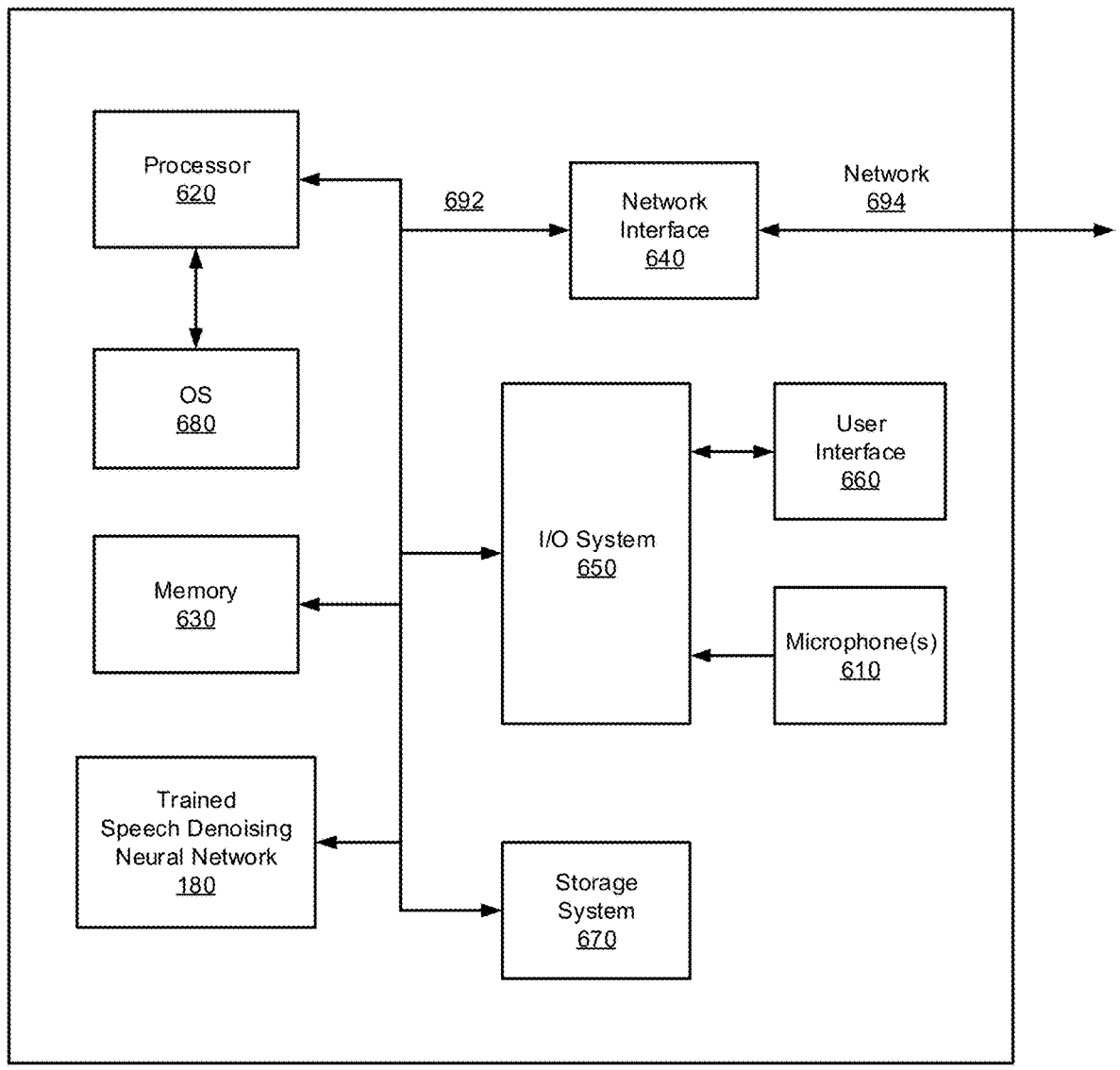
FIG. 6 is a block diagram schematically illustrating a speech enabled device platform configured to perform speech denoising, in accordance with certain embodiments of the present disclosure.

FIG. 6 illustrates an example platform 600, configured in accordance with certain embodiments of the present disclosure, to perform speech denoising. In some embodiments, platform 600 may be hosted on, or otherwise be incorporated into a speech enabled device, (for example, a smartphone, smart-speaker, smart-tablet, personal assistant, smart home management system), a personal computer, workstation, laptop computer, ultra-laptop computer, tablet, touchpad, portable computer, handheld computer, palmtop computer, messaging device, data communication device, wearable device, and so forth. Any combination of different devices may be used in certain embodiments.

In some embodiments, platform 600 may comprise any combination of a processor 620, a memory 630, a trained speech denoising neural network 180, a network interface 640, an input/output (I/O) system 650, a user interface 660, microphone(s) 610, and a storage system 670. As can be further seen, a bus and/or interconnect 692 is also provided to allow for communication between the various components listed above and/or other components not shown. Platform 600 can be coupled to a network 694 through network interface 640 to allow for communications with other computing devices, platforms, devices to be controlled, or other resources. Other componentry and functionality not reflected in the block diagram of FIG. 6 will be apparent in light of this disclosure, and it will be appreciated that other embodiments are not limited to any particular hardware configuration.

Processor 620 can be any suitable processor, and may include one or more coprocessors or controllers, such as an audio processor, a graphics processing unit, or hardware accelerator, to assist in control and processing operations associated with platform 600. In some embodiments, the processor 620 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 620 may be implemented as a complex instruction set computer (CISC) or a reduced instruction set computer (RISC) processor. In some embodiments, processor 620 may be configured as an x86 instruction set compatible processor.

Memory 630 can be implemented using any suitable type of digital storage including, for example, flash memory and/or random-access memory (RAM). In some embodiments, the memory 630 may include various layers of memory hierarchy and/or memory caches as are known to those of skill in the art. Memory 630 may be implemented as a volatile memory device such as, but not limited to, a RAM, dynamic RAM (DRAM), or static RAM (SRAM) device. Storage system 670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 670 may comprise technology to increase the storage performance enhanced protection for valuable digital media when multiple hard drives are included.

Processor 620 may be configured to execute an Operating System (OS) 680 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 600, and therefore may also be implemented using any suitable existing or subsequently-developed platform.

Network interface circuit 640 can be any appropriate network chip or chipset which allows for wired and/or wireless connection between other components of device platform 600 and/or network 694, thereby enabling platform 600 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 650 may be configured to interface between various I/O devices and other components of device platform 600. I/O devices may include, but not be limited to, user interface 660 and microphone(s) 610. User interface 660 may include devices (not shown) such as a display element, speaker, touchpad, keyboard, and mouse, etc. I/O system 650 may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 620 or any chipset of platform 600.

It will be appreciated that in some embodiments, the various components of platform 600 may be combined or integrated in a system-on-a-chip (SoC) architecture. In some embodiments, the components may be hardware components, firmware components, software components or any suitable combination of hardware, firmware or software.

Speech denoising neural network 180 is trained and configured to process a speech signal that has been corrupted by additive noise and generate an output signal that includes primarily the speech content, as described previously. Speech denoising neural network 180 is trained with deep feature losses generated by an audio classifier neural network. Speech denoising neural network 180 may include any or all of the circuits/components illustrated in FIGS. 1-4, as described above. These components can be implemented or otherwise used in conjunction with a variety of suitable software and/or hardware that is coupled to or that otherwise forms a part of platform 600. These components can additionally or alternatively be implemented or otherwise used in conjunction with user I/O devices that are capable of providing information to, and receiving information and commands from, a user.

In some embodiments, these circuits may be installed local to platform 600, as shown in the example embodiment of FIG. 6. Alternatively, platform 600 can be implemented in a client-server arrangement wherein at least some functionality associated with these circuits is provided to platform 600 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 694 or remotely coupled to network 694 by one or more other networks and/or communication channels. In some cases, access to resources on a given network or computing system may require credentials such as usernames, passwords, and/or compliance with any other suitable security mechanism.

In various embodiments, platform 600 may be implemented as a wireless system, a wired system, or a combination of both. When implemented as a wireless system, platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the speech denoising methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. In other embodiments, the functionalities disclosed herein can be incorporated into other voice-enabled devices and speech-based software applications, such as, for example, automobile control/navigation, smart-home management, entertainment, personal assistant, and robotic applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for speech denoising, the method comprising: applying, by a processor-based system, a speech denoising neural network to a noisy sample of a training speech signal to generate a processed training speech signal; applying, by the processor-based system, a trained audio classifier neural network to the processed training speech signal to generate a first set of activation features; applying, by the processor-based system, the trained audio classifier neural network to a clean sample of the training speech signal to generate a second set of activation features; calculating, by the processor-based system, a loss value based on the first set of activation features and the second set of activation features; and performing, by the processor-based system, a back-propagation training update of the speech denoising neural network, based on the loss value, to generate a trained speech denoising neural network.

Example 2 includes the subject matter of Example 1, further comprising applying the trained speech denoising neural network to a noisy operational speech signal to generate a denoised speech signal.

Example 3 includes the subject matter of Examples 1 or 2, wherein the loss value calculation is a weighted least absolute distance (L1-norm) between the first set of activation features and the second set of activation features.

Example 4 includes the subject matter of any of Examples 1-3, wherein the trained audio classifier neural network comprises a plurality of convolutional layers, each of the convolutional layers to generate activation features of the first set of activation features and the second set of activation features.

Example 5 includes the subject matter of any of Examples 1-4, wherein the activation features of the first set of activation features and the second set of activation features are selected from activation features generated by a subset of the shallowest layers of the trained audio classifier neural network.

Example 6 includes the subject matter of any of Examples 1-5, wherein the speech denoising neural network comprises a plurality of dilated convolutional layers and a convolutional synthesis layer.

Example 7 includes the subject matter of any of Examples 1-6, further comprising applying an adaptive normalization and a leaky rectified linear unit (LReLU) activation function to outputs of operations within the dilated convolutional layers.

Example 8 is a system for speech denoising, the system comprising: a speech denoising neural network to generate a processed training speech signal based on a provided noisy sample of a training speech signal; a trained audio classifier neural network to generate a first set of activation features based on the processed training speech signal and to generate a second set of activation features based on a clean sample of the training speech signal; a loss calculation circuit to calculate a loss value based on the first set of activation features and the second set of activation features; and a back-propagation training update circuit to perform a back-propagation training update of the speech denoising neural network, based on the loss value, to generate a trained speech denoising neural network.

Example 9 includes the subject matter of Example 8, wherein the trained speech denoising neural network is to generate a denoised speech signal based on a provided noisy operational speech signal.

Example 10 includes the subject matter of Examples 8 or 9, wherein the loss value calculation is a weighted least absolute distance (L1-norm) between the first set of activation features and the second set of activation features.

Example 11 includes the subject matter of any of Examples 8-10, wherein the trained audio classifier neural network comprises a plurality of convolutional layers, each of the convolutional layers to generate activation features of the first set of activation features and the second set of activation features.

Example 12 includes the subject matter of any of Examples 8-11, wherein the activation features of the first set of activation features and the second set of activation features are selected from activation features generated by a subset of the shallowest layers of the trained audio classifier neural network.

Example 13 includes the subject matter of any of Examples 8-12, wherein the speech denoising neural network comprises a plurality of dilated convolutional layers and a convolutional synthesis layer.

Example 14 includes the subject matter of any of Examples 8-13, wherein the dilated convolutional layers further comprise an adaptive normalization and leaky rectified linear unit (LReLU) activation function circuit to process outputs of dilated convolution operations.

Example 15 is at least one non-transitory computer readable storage medium having instructions encoded thereon that, when executed by one or more processors, cause a process to be carried out for speech denoising, the process comprising: applying a speech denoising neural network to a noisy sample of a training speech signal to generate a processed training speech signal; applying a trained audio classifier neural network to the processed training speech signal to generate a first set of activation features; applying the trained audio classifier neural network to a clean sample of the training speech signal to generate a second set of activation features; calculating a loss value based on the first set of activation features and the second set of activation features; and performing a back-propagation training update of the speech denoising neural network, based on the loss value, to generate a trained speech denoising neural network.

Example 16 includes the subject matter of Example 15, further comprising the operation of applying the trained speech denoising neural network to a noisy operational speech signal to generate a denoised speech signal.

Example 17 includes the subject matter of Examples 15 or 16, wherein the loss value calculation is a weighted least absolute distance (L1-norm) between the first set of activation features and the second set of activation features.

Example 18 includes the subject matter of any of Examples 15-17, wherein the trained audio classifier neural network comprises a plurality of convolutional layers, each of the convolutional layers to generate activation features of the first set of activation features and the second set of activation features.

Example 19 includes the subject matter of any of Examples 15-18, wherein the activation features of the first set of activation features and the second set of activation features are selected from activation features generated by a subset of the shallowest layers of the trained audio classifier neural network.

Example 20 includes the subject matter of any of Examples 15-19, wherein the speech denoising neural network comprises a plurality of dilated convolutional layers and a convolutional synthesis layer, and further comprising the operation of applying an adaptive normalization and a leaky rectified linear unit (LReLU) activation function to outputs of operations within the dilated convolutional layers.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for speech denoising, the method comprising:
    applying, by a processor-based system, a speech denoising neural network to a noisy sample of a training speech signal to generate a processed training speech signal;
    applying, by the processor-based system, a trained audio classifier neural network to the processed training speech signal to generate a first set of activation features;
    applying, by the processor-based system, the trained audio classifier neural network to a clean sample of the training speech signal to generate a second set of activation features;
    calculating, by the processor-based system, a loss value based on the first set of activation features and the second set of activation features; and
    performing, by the processor-based system, a back-propagation training update of the speech denoising neural network, based on the loss value, to generate a trained speech denoising neural network.

2. The method of claim 1, further comprising applying the trained speech denoising neural network to a noisy operational speech signal to generate a denoised speech signal.

3. The method of claim 1, wherein the loss value calculation is a weighted least absolute distance (L1-norm) between the first set of activation features and the second set of activation features.

4. The method of claim 1, wherein the trained audio classifier neural network comprises a plurality of convolutional layers, each of the convolutional layers to generate activation features of the first set of activation features and the second set of activation features.

5. The method of claim 4, wherein the activation features of the first set of activation features and the second set of activation features are selected from activation features generated by a subset of the shallowest layers of the trained audio classifier neural network.

6. The method of claim 1, wherein the speech denoising neural network comprises a plurality of dilated convolutional layers and a convolutional synthesis layer.

7. The method of claim 6, further comprising applying an adaptive normalization and a leaky rectified linear unit (LReLU) activation function to outputs of operations within the dilated convolutional layers.

8. A system for speech denoising, the system comprising:
    a speech denoising neural network to generate a processed training speech signal based on a provided noisy sample of a training speech signal;
    a trained audio classifier neural network to generate a first set of activation features based on the processed training speech signal and to generate a second set of activation features based on a clean sample of the training speech signal;
    a loss calculation circuit to calculate a loss value based on the first set of activation features and the second set of activation features; and
    a back-propagation training update circuit to perform a back-propagation training update of the speech denoising neural network, based on the loss value, to generate a trained speech denoising neural network.

9. The system of claim 8, wherein the trained speech denoising neural network is to generate a denoised speech signal based on a provided noisy operational speech signal.

10. The system of claim 8, wherein the loss value calculation is a weighted least absolute distance (L1-norm) between the first set of activation features and the second set of activation features.

11. The system of claim 8, wherein the trained audio classifier neural network comprises a plurality of convolutional layers, each of the convolutional layers to generate activation features of the first set of activation features and the second set of activation features.

12. The system of claim 11, wherein the activation features of the first set of activation features and the second set of activation features are selected from activation features generated by a subset of the shallowest layers of the trained audio classifier neural network.

13. The system of claim 8, wherein the speech denoising neural network comprises a plurality of dilated convolutional layers and a convolutional synthesis layer.

14. The system of claim 13, wherein the dilated convolutional layers further comprise an adaptive normalization and leaky rectified linear unit (LReLU) activation function circuit to process outputs of dilated convolution operations.

15. At least one non-transitory computer readable storage medium having instructions encoded thereon that, when executed by one or more processors, cause a process to be carried out for speech denoising, the process comprising:
    applying a speech denoising neural network to a noisy sample of a training speech signal to generate a processed training speech signal;
    applying a trained audio classifier neural network to the processed training speech signal to generate a first set of activation features;

applying the trained audio classifier neural network to a clean sample of the training speech signal to generate a second set of activation features;

calculating a loss value based on the first set of activation features and the second set of activation features; and performing a back-propagation training update of the speech denoising neural network, based on the loss value, to generate a trained speech denoising neural network.

16. The computer readable storage medium of claim 15, further comprising the operation of applying the trained speech denoising neural network to a noisy operational speech signal to generate a denoised speech signal.

17. The computer readable storage medium of claim 15, wherein the loss value calculation is a weighted least absolute distance (L1-norm) between the first set of activation features and the second set of activation features.

18. The computer readable storage medium of claim 15, wherein the trained audio classifier neural network comprises a plurality of convolutional layers, each of the convolutional layers to generate activation features of the first set of activation features and the second set of activation features.

19. The computer readable storage medium of claim 18, wherein the activation features of the first set of activation features and the second set of activation features are selected from activation features generated by a subset of the shallowest layers of the trained audio classifier neural network.

20. The computer readable storage medium of claim 15, wherein the speech denoising neural network comprises a plurality of dilated convolutional layers and a convolutional synthesis layer, and further comprising the operation of applying an adaptive normalization and a leaky rectified linear unit (LReLU) activation function to outputs of operations within the dilated convolutional layers.

* * * * *